US009660485B2

(12) United States Patent
Naskali et al.

(10) Patent No.: US 9,660,485 B2
(45) Date of Patent: May 23, 2017

(54) METHODS AND APPARATUS FOR ELECTRONIC DEVICE POWER

(71) Applicant: Nokia Corporation, Espoo (FI)

(72) Inventors: Matti Juhani Naskali, Tokyo (JP); Heikki Paananen, Nagano (JP)

(73) Assignee: Nokia Technologies Oy, Espoo (FI)

( * ) Notice: Subject to any disclaimer, the term of this patent is extended or adjusted under 35 U.S.C. 154(b) by 331 days.

(21) Appl. No.: 14/307,576

(22) Filed: Jun. 18, 2014

(65) Prior Publication Data
US 2015/0372536 A1    Dec. 24, 2015

(51) Int. Cl.
| H02J 7/00 | (2006.01) |
| H02J 9/00 | (2006.01) |
| H02J 9/06 | (2006.01) |
| H02J 7/35 | (2006.01) |

(52) U.S. Cl.
CPC .... *H02J 9/06* (2013.01); *H02J 7/35* (2013.01); *H02J 9/005* (2013.01); *Y02B 10/72* (2013.01); *Y10T 307/615* (2015.04); *Y10T 307/625* (2015.04)

(58) Field of Classification Search
CPC .......... H02J 9/061; H02J 7/0068; H02J 9/062; H02J 9/06; H02J 7/35; H02J 7/007; H02J 3/383; H02J 7/0077; H02J 1/10
USPC .......................................................... 307/66
See application file for complete search history.

(56) References Cited

U.S. PATENT DOCUMENTS

| 6,664,792 | B1 * | 12/2003 | Nguyen ................. G01R 31/40 324/433 |
| 6,715,088 | B1 * | 3/2004 | Togawa ................ G06F 1/3203 713/310 |
| 9,190,915 | B2 * | 11/2015 | Inoue ................ H02M 3/33584 |
| 2003/0202344 | A1 | 10/2003 | Kenny et al. |
| 2006/0176040 | A1 * | 8/2006 | Kernahan ............. G06F 1/3203 323/299 |
| 2010/0271199 | A1 | 10/2010 | Belov et al. |
| 2011/0156634 | A1 | 6/2011 | Lai |
| 2011/0267068 | A1 | 11/2011 | Xu et al. |
| 2012/0297286 | A1 * | 11/2012 | Nagahama ........ G06F 17/30864 715/234 |
| 2013/0205147 | A1 * | 8/2013 | Tsao ..................... G06F 1/3212 713/322 |
| 2013/0336185 | A1 | 12/2013 | Yang et al. |

(Continued)

OTHER PUBLICATIONS

"Solar-powered calculator," http://en.wikipedia.org/wiki/Solar-powered_calculator (3 pages).

(Continued)

*Primary Examiner* — Jared Fureman
*Assistant Examiner* — Esayas Yeshaw
(74) *Attorney, Agent, or Firm* — Harrington & Smith

(57) ABSTRACT

Improved mechanisms for automated control of harvested energy delivery are described. A device harvests and stores energy and activates a controller when a sufficient level of stored energy is achieved. The controller retrieves previous power-off state information determines status information, and activates and powers a powered device. Just before insufficient energy remains to power the powered device, the controller stores shutdown status information and enters a power-off state.

20 Claims, 2 Drawing Sheets

(56) References Cited

U.S. PATENT DOCUMENTS

2014/0183947 A1* 7/2014 Chandler ............... H02J 9/061
                                                                                  307/23

OTHER PUBLICATIONS

*Battery and Energy Technologies*, "Capacitors and SuperCapacitors," http://www.mpoweruk.com/supercaps.htm (5 pages).
*BRIDGE—Building Radio frequency IDentification solutions for the Global Environment*; Chapter 2.4.3-2.4.4 (4 pages).

* cited by examiner

METHODS AND APPARATUS FOR ELECTRONIC DEVICE POWER

TECHNICAL FIELD

The present invention relates generally to providing electric power to portable electronic devices. More particularly, the invention relates to managing power to a device while providing for orderly management of periods in which energy to power the device is unavailable.

BACKGROUND

Many modern electronic devices consume very low power and can maintain operation on a single battery charge for months or possibly even years, and other devices can maintain operation using power sources such as photoelectric cells if energy is available to be harvested to power the device. For devices using harvestable energy, a device is often provided with a backup battery. In prior-art devices with a battery, the battery may discharge. If a non-rechargeable battery discharges, it must be replaced. If a rechargeable battery charges, it may be recharged, but if a rechargeable battery remains discharged for a long time, it may fail irrecoverably, or at least lose a portion of its charge capacity.

SUMMARY

In one embodiment of the invention an apparatus comprises an energy harvesting component and an energy storage component receiving energy from the energy harvesting component and storing the received energy. The apparatus further comprises a controller for managing delivery of energy harvested by the energy harvesting component to a powered device. The controller is configured to at least, when in a power-off state, automatically switch to a power-on state when the stored energy reaches a predetermined level, determine the power-off state of the controller before start, determine status information, activate the powered device, and upon detecting that insufficient energy is available to continue powering a powered device, shut down the powered device, store power-off status information, and enter a power-off state.

In another embodiment of the invention, a method comprises managing harvesting of energy available in the environment, managing storage of the harvested energy, and managing delivery of harvested energy, stored energy, or both, to a powered device, by at least when in a power-off state, automatically switching to a power-on state when the stored energy reaches a predetermined level, determining a power-off state before start, determining status information, activating the powered device, and upon detecting that insufficient energy is available to continue powering the powered device, shutting down the powered device, storing power-off status information, and entering a power-off state.

In another embodiment of the invention, an apparatus comprises a photovoltaic cell configured to convert light energy to electricity, one or more capacitors configured to store electric power generated by the photovoltaic cell, and a sensor device powered by one or more of electric power generated by the photovoltaic cell or stored electric power delivered from the one or more capacitors. The apparatus further comprises a controller for managing delivery of electric power delivered to the sensor device. The controller is configured to at least alternate between an operating mode during which electric power is delivered to the sensor device and a deep sleep mode during which no electric power is delivered to the sensor device and the controller maintains a sufficient operational state to be aware of when it needs to alternate to the operational mode and, when insufficient stored electric power is available to continue alternating between the deep sleep mode and the operating mode, shut down the sensor and enter a fully power-off state.

In another embodiment of the invention, an apparatus comprises means for harvesting energy available in the environment, means for storing the harvested energy, and means for managing delivery of energy harvested by the energy harvesting component to a powered device. Managing delivery of the energy comprises, when in a power-off state, automatically switching to a power-on state when the stored energy reaches a predetermined level, determining a previous power-off state before the power-on state was entered, activating the powered device, and, upon detecting that insufficient energy is available to continue powering the powered device, shutting down the powered device, storing power-off status information, and entering a power-off state.

DETAILED DESCRIPTION

Embodiments of the present invention may address problems involved with providing power to devices that should operate for a long time without intervention or should start operation with minimal effort by a user. Embodiments of the invention may also address problems relating to managing of the harvesting of available energy for device operation and charge storage during all possible conditions, including extended periods when no energy is available for harvest. In one or more embodiments, the invention may provide for delivering available energy to a storage element without any energy consumption (such as when the available charge in the storage element and the available energy from the surroundings does not provide sufficient power for operation), and in one or more embodiments, the invention may provide for automatic initiation of operation without any user intervention, when sufficient power is available for operation.

Figure 1:
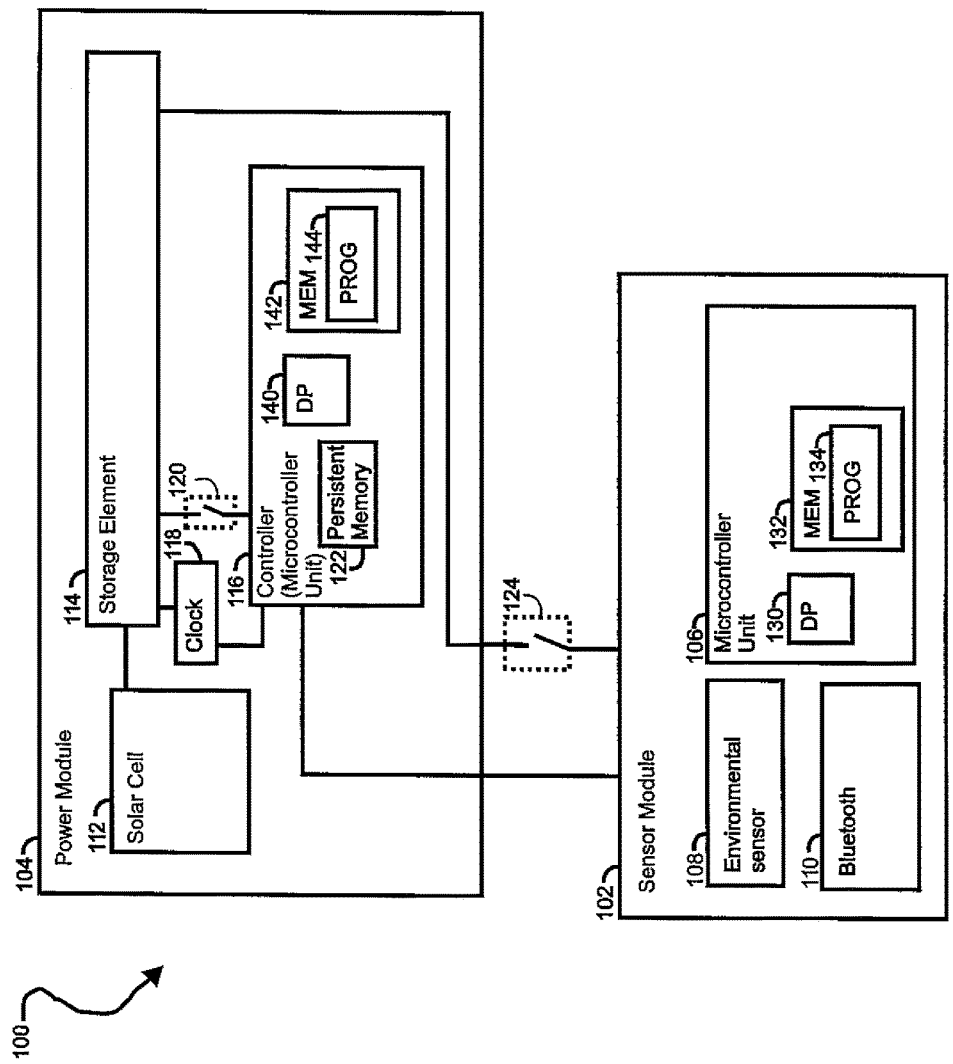
FIG. 1 illustrates a device according to an embodiment of the present invention.

FIG. 1 illustrates an electronic 100 device according to an embodiment of the present invention. The device may be, for example, an environmental sensor, but it will be recognized that embodiments of the present invention may be used in or with any number of devices. To take another example, a power supply mechanism according to one or more embodiments of the invention may be implemented in the form of an independent module that can be installed in different suitable devices.

The electronic device 100 comprises an environmental sensor module 102 and a power module 104. In one or more embodiments of the invention, the sensor module 102 may be implemented as a system on chip, and may be capable of data communication using, for example, Bluetooth. In the present example, the sensor module 102 comprises a microcontroller unit 106, an environmental sensor 108, and a Bluetooth module 110. The sensor module 102 draws power from the power module 104. The power module 104 comprises an energy conversion element, implemented here as a photovoltaic cell, or solar cell 112. The power module 104 may also comprise elements such as a storage element 114, controller 116, which may be implemented as a microcontroller unit, and clock 118. It will be recognized that while a solar cell 112 is illustrated here, the energy conversion element may be implemented by any mechanism capable of generating electricity from energy available in the surrounding environment, such as a thermoelectric generator or any other suitable mechanism. The storage element 114 may be, for example, a capacitor, but in other embodiments may be a rechargeable battery. One particular advantage of a capacitor is that capacitors can be obtained that have virtually unlimited lifetimes and can operate without degradation through very large numbers of charge and discharge cycles.

The solar cell 112 is connected directly to the storage element 114 with no regulator, so that even the smallest quiescent current consumption that could be imposed by a regulator is eliminated, so that all available energy is directed to the storage element 108 and stored without being consumed. The controller 116 is connected to the storage element 114, and (through a switch 120) to the clock 118.

Suppose that the device 100 starts from a completely dead state, with no energy stored in the storage element 114. Suppose now that the device is placed in sunlight or some other sufficiently strong light so that the solar cell 112 begins to generate electricity and deliver the electricity to the storage element 114. As the energy level of the storage element rises, the voltage also rises, so that the voltage provides an indication of the energy level. The energy level can therefore be detected.

As noted above, the solar cell 112 is connected to the storage element 114, and upon detection that the specified energy level has been achieved for the storage element 114 (manifested by an increased voltage encountered by the solar cell 112) the controller 116 wakes. Waking of the controller 116 may be achieved, for example, by delivery of power by the solar cell 112 above a specified threshold, or by storage of sufficient power in the storage element 114. The storage of sufficient power 114 may cause closing of the switch 120.

The controller 116 may use persistent memory 122 and may store static settings indicating its power-off state. Upon initial activation, the controller 116 checks the persistent memory 122 to determine its power-off state before activation. On power-off, the controller 116 may have entered either a "dead mode" or a "deep sleep mode". The controller enters the "dead mode" when no power is available to power any portion of the system, and the controller 116 may enter the "deep sleep mode" state on a cycle in order to maintain a low average power consumption by cycling between going into a deep sleep mode and waking up into an operational mode. When the controller 116 is in the "deep sleep mode", sufficient power is available to power the clock 118 in order to track the length of time the controller 116 has been shut down. The controller 116 may store its power-off state including the energy level when it was shut down and a set of default values in the persistent memory 122. During "deep sleep" mode, there is almost no power consumption, and if the controller 116 wakes up and detects that the power level has not changed, it will recognize that no harvested energy was available during the time the controller 116 was in the "deep sleep mode". If the sensor module 102 continues to operate and no additional power is harvested, the storage element will eventually be depleted of energy and the controller 116 will enter a "dead mode" during which it will no longer wake up until the storage element 114 reaches a sufficient energy level.

Upon waking up from a "dead mode" the controller 116 sets relevant parameters to default values and performs default operations such as starting the clock 118. The controller 116 may then activate the sensor module 102 (which in the present example is the element being powered) by directing the storage module to close a switch 124. The controller 116 may also update its status information, reading energy level from the storage element 114 and harvested energy amount from the solar cell 112. In the present example, the sensor module 102 communicates with external devices using the Bluetooth module 110, and is able to use the Bluetooth module 110 to deliver data to the external devices.

The controller 116 may thus provide the storage element energy level and harvested energy amount information to the sensor module 102. The Bluetooth module 110 may, for example, be a Bluetooth low energy module that transmits information at specified intervals, with the period being specified (for example) based on the available energy. When the energy in the storage element 114 is at or above a threshold allowing for normal operation, the transmission interval may be a standard interval such as once a second, with the interval increasing as less energy is available.

The sensor module 102 may operate in advertising mode, which is a mode of Bluetooth low energy (BLE) devices in which a BLE device broadcasts data to devices in its vicinity without pairing. Such advertising may be performed very rapidly at very low energy. The sensor module 102 broadcasts sensed environment information to devices in its vicinity. Such information may, for example, include temperature, light level, or other specified information. It will be recognized that while the use of Bluetooth to automatically broadcast information using Bluetooth is discussed here, the use of a wireless communication element is exemplary only and that sensed environmental information may be delivered to a directly connected device, stored for retrieval, or communicated to any devices desired in any way desired, depending on system design. It will also be recognized that the sensor module 102 is presented here as an example of a device that may suitably be powered using mechanisms according to embodiments of the invention, but that any number of other devices may be used, particularly those that exhibit low power consumption and are designed to be placed in environments where they may operate for a long time without intervention. It will be further recognized that the example presented here uses the advertising mode of a BLE device, but it is also possible for a Bluetooth device to deliver information such as that presented here by connecting to paired devices, first performing pairing if needed.

In addition to the "dead mode", the power module 104 may, as noted above, shut off to the "deep sleep" mode, in which sufficient power is available to operate a clock. The controller 102 may store a "deep sleep" status when it enters the "deep sleep" mode, directing the storage element 114 to open the switch 124 in order to remove the load presented by the sensor module 102, and storing the clock reading and a "deep sleep mode" status" indicator in the persistent memory 122. The clock 118 continues to run.

As noted above, the controller 116 alternates between operating mode and "deep sleep" mode. In one or more exemplary embodiments, the controller 116 may maintain an operating state sufficient to detect the voltage level of the storage element 114, and when the voltage level of the storage element 114 indicates that there will soon be insufficient energy to power even the clock, the controller 116 stops the clock, stores the "dead mode" status and disconnects from the storage element 114, opening a switch 120. In one or more alternative or additional embodiments, a device can open the switch 124 and subsequently the switch 120 without determining if it is going into the "dead mode" state or the "deep sleep mode" state or storing an indicator or (if in a deep sleep mode state) the clock value. Instead, the switch 124 may simply disconnect when there is insufficient energy to the sensor module 102 and the switch 120 may disconnect when insufficient energy is available to operate any component. In such embodiments, the clock may provide an indication if it is in a valid mode or is in an invalid mode (which may result from a loss of power). On waking, the controller 116 may check the clock 118 to determine if the clock 118 is in a valid mode. If the clock 118 is in a valid mode, the controller will be aware that the previous state was a "deep sleep mode" state and if the clock 118 is not in a valid mode, the controller 116 will be aware that the previous state was a "dead mode" state.

Figure 2:
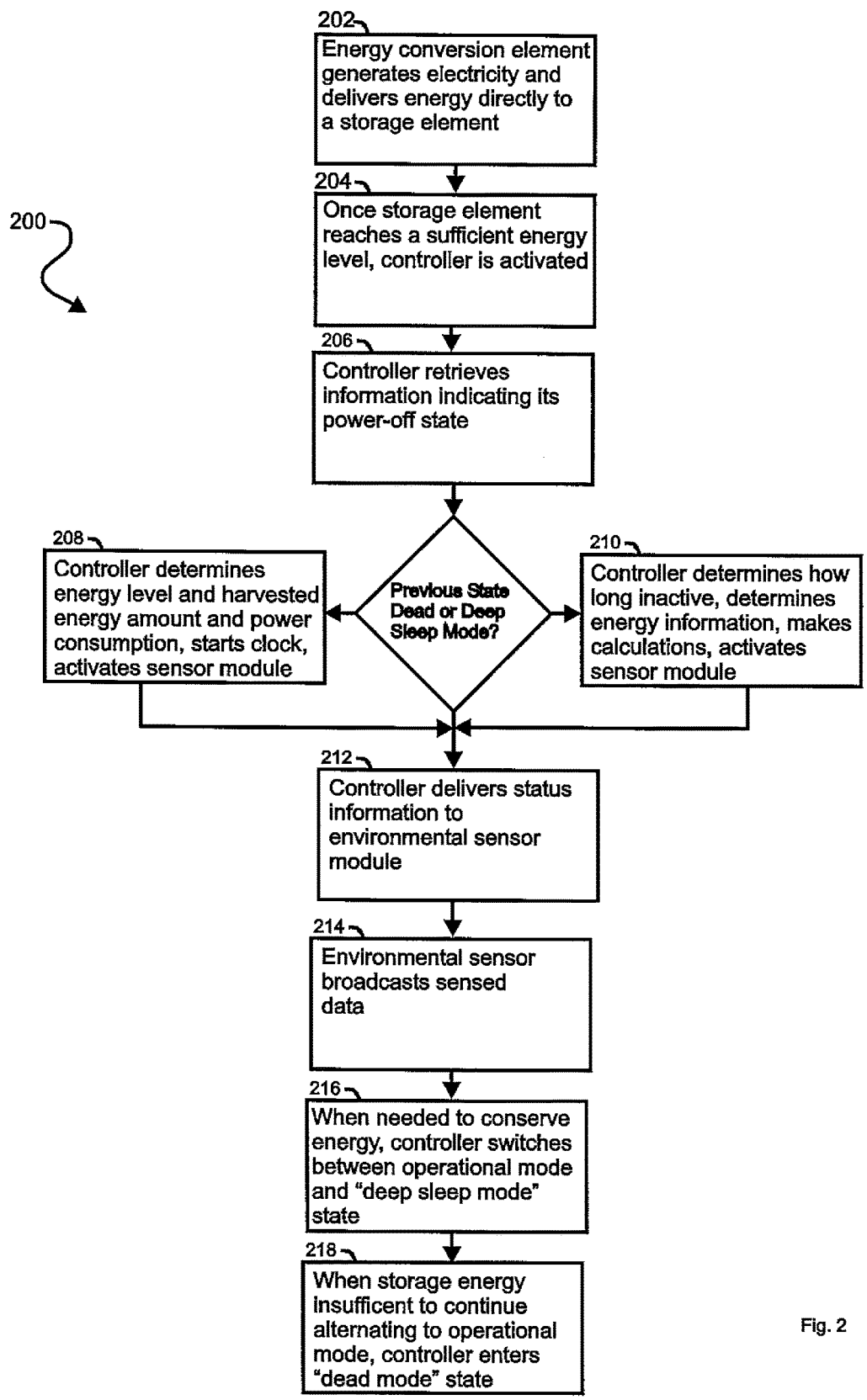
FIG. 2 illustrates a process according to an embodiment of the present invention.

FIG. 2 illustrates a process of supplying power according to an embodiment of the present invention. At block 202, an energy conversion element (such as a solar cell) belonging to a device in a power-off state inactive state generates electricity from energy available in its environment and delivers this energy directly to a storage element (such as a capacitor or bank of capacitors). The power-off state may be a "dead mode" state or a "deep sleep mode" state. Once the storage element reaches a sufficient energy level, the process proceeds to block 204 and a controller is activated. At block 206, the controller retrieves information indicating its previous power-off state, and determines the previous power-off state. If the previous power-off state was a "dead mode" state, the process proceeds to block 208 and the controller determines energy level and harvested energy amount information from the storage element and energy conversion element, and also determines power consumption. The controller also starts a clock and activates a module being powered. If the previous power-off state was a "deep sleep mode" state (with the determination being made, for example, through examination of a stored status indicator or by a status check on wakeup such as determination if the clock is in a valid mode), the process proceeds to block 210 and the controller reads the clock to determine the length of time during which it was inactive, determines the energy level, harvested energy amount, and power consumption, makes predetermined calculations, and activates the module being powered.

In the present example, the module being powered is an environmental sensor module with wireless communication capabilities—for example, Bluetooth. At block 212, the controller delivers status information to the environmental sensor module. This information may include the previous power-off state, and energy level, amount, and power consumption. If the controller was in a "deep sleep" mode, the status information may also include the clock value and the length of time the device was in the power-off state. At block 214, the environmental sensor module broadcasts the data sensed from the environment, and continues while power is available, suitably at an interval determined by the available energy. The energy conversion element delivers energy to the storage element to meet operating needs and to maintain an appropriate stored energy level.

Suppose now that energy becomes unavailable for harvest. The energy level of the storage element begins to decline. When the stored energy reaches a specified level, the process proceeds to block 216 and the device begins to alternate between the operating mode and a "deep sleep mode" state. To enter the "deep sleep mode" state, the controller disconnects the environmental sensor, stores a clock value and a "deep sleep mode" power off state indicator, and shuts down most operations of the controller, leaving the clock operating and maintaining the capability to sense the energy level of the storage element and perform a final shutdown. If energy remains unavailable for harvest, eventually the stored energy will be depleted so that it is impossible to continue alternating between the operating mode and the "deep sleep mode" state. Such a condition can be sensed when the controller is in the operating mode. When the controller is in operating mode (meaning, in the present example, that sensed environmental information is being broadcast on some schedule), but the controller senses that the energy level is such that it is necessary to perform a total shutdown, the process proceeds to block 218 and the device enters the "dead mode" state, disconnecting itself from the storage element. In some embodiments of the invention, the device stores a "dead mode" state indicator, and in other embodiments, the status of the clock (in an invalid mode due to disconnection of power) will serve as an indication on wakeup that the device's power off state is a "dead mode" state. The device is now in a complete power off state in which no activity occurs, but when energy becomes available from the environment and the storage element reaches a sufficient capacity, the process starts again at block 202.

Returning now to FIG. 1, the microcontroller unit 106 comprises a data processor (DP) 130 and memory (MEM) 132, with the memory storing one or more programs (PROGS) 134. The controller 116 similarly comprises a data processor (DP) 140 and memory (MEM) 142, with the memory storing one or more programs (PROGS) 144. At least one of the PROGs 134 in the microcontroller unit 106 is assumed to include a set of program instructions that, when executed by the associated DP 130, enable the device to operate in accordance with the exemplary embodiments of this invention, as detailed above. In these regards the exemplary embodiments of this invention may be implemented at least in part by computer software stored on the MEM 132, which is executable by the DP 130 of the microcontroller unit 106, or by hardware, or by a combination of tangibly stored software and hardware (and tangibly stored firmware). Similarly, at least one of the PROGs 144 in the controller 116 is assumed to include a set of program instructions that, when executed by the associated DP 140, enable the device to operate in accordance with the exemplary embodiments of this invention, as detailed above. In these regards the exemplary embodiments of this invention may be implemented at least in part by computer software stored on the MEM 142, which is executable by the DP 140 of the controller 116, or by hardware, or by a combination of tangibly stored software and hardware (and tangibly stored firmware). An electronic device implementing these aspects of the invention need not be the entire device as depicted at FIG. 1 or may be one or more components of same such as the above described tangibly stored software, hardware, firmware and DP, or a system on a chip SOC or an application specific integrated circuit ASIC. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports The MEMs 132 and 142 may be of any type suitable to the local technical environment and may be implemented using any suitable data storage technology, such as semiconductor based memory devices, magnetic memory devices and systems, optical memory devices and systems, fixed memory and removable memory. The DPs 130 and 140 may be of any type suitable to the local technical environment, and may include one or more of general purpose computers, special purpose computers, microprocessors, digital signal processors (DSPs) and processors based on a multi-core processor architecture, as non-limiting examples.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
an energy harvesting component;
an energy storage component receiving energy from the energy harvesting component and storing the received energy; and
a controller for managing delivery of energy harvested by the energy harvesting component to a powered device, wherein the controller is configured to at least:
when in a power-off state, automatically switch to a power-on state when the stored energy reaches a pre-determined level;
determine a previous power-off state of the controller before the controller entered the power-on state, wherein the determined previous power-off state is either a dead mode state or a deep sleep mode state, wherein in the dead mode state a clock does not keep time of the length of time of the dead mode state and in the deep sleep mode state the clock keeps time of the length of time of the deep sleep mode;
performing at least one dead mode state action if the determined previous power-off state is the dead mode state, wherein the controller starts the clock, or performing at least one deep sleep mode action if the determined previous power-off state is the deep sleep mode state, wherein the controller reads the clock to determine the length of time of the deep sleep mode;
activate the powered device; and
upon detecting that insufficient energy is available to continue powering the powered device, shut down the powered device, store power-off status information, and enter a power-off state.

2. The apparatus of claim 1, wherein the controller is further caused to determine status information upon entering the power-on state.

3. The apparatus of claim 1, wherein entering the power-off state comprises storing a deep sleep mode indicator when sufficient stored energy remains to maintain a minimal operational state and wherein the controller stores a dead mode state indicator and stops all functioning when insufficient energy is available to maintain the minimal operational state.

4. The apparatus of claim 3, wherein a clock remains operational during the minimal operational state and wherein, upon recovering from the minimal operational state, the controller reads the clock and determines the duration of inactivity.

5. The apparatus of claim 1, wherein status information comprises stored energy level and harvested energy amount and wherein the status information is delivered to the powered device.

6. The apparatus of claim 5, wherein the operation of the powered device is adjusted based on the availability of energy to be delivered by the apparatus.

7. The apparatus of claim 6, wherein the powered device periodically transmits information and wherein the frequency of transmission of the information is adjusted based on the availability of energy to be delivered by the apparatus.

8. The apparatus of any of claim 1, wherein the energy storage component comprises one or more capacitors.

9. The apparatus of any of claim 1, wherein the energy storage component comprises one or more rechargeable batteries.

10. A method comprising:
harvesting energy available in the environment;
storing the harvested energy; and
managing delivery of energy harvested by the energy harvesting component to a powered device, comprising:
when in a power-off state, automatically switching to a power-on state when the stored energy reaches a pre-determined level;
determining a previous power-off state before the power-on state was entered wherein if the determined previous power-off state is a dead mode state a clock does not keep time of the length of time of the dead mode state and if the determined previous power-off state is a deep sleep mode state, the clock keeps time of the length of time of the deep sleep mode, wherein at least one dead mode state action is performed if the determined previous power-off state is the dead mode state where the controller starts the clock, and wherein at least one deep sleep mode action is performed if the determined previous power-off state is the deep sleep mode state where the controller reads the clock to determine the length of time of the deep sleep mode;
activating the powered device; and
upon detecting that insufficient energy is available to continue powering the powered device, shutting down the powered device, storing power-off status information, and entering a power-off state.

11. The method of claim 10, further comprising determining status information upon entering the power-on state.

12. The method of claim 10, wherein entering the power-off state comprises storing a deep sleep mode indicator when sufficient stored energy remains to maintain a minimal operational state and further comprising storing a dead mode state indicator and stopping all functioning when insufficient energy is available to maintain the minimal operational state.

13. The method of claim 12, wherein a clock remains operational during the minimal operational state and further comprising, upon recovering from the minimal operational state, reading the clock and determining the duration of inactivity.

14. The method of any of claim 10, wherein status information comprises stored energy level and harvested energy amount and wherein the status information is delivered to the powered device.

15. The method of claim 14, wherein the operation of the powered device is adjusted based on the availability of energy to be delivered.

16. The method of any of claim 10, wherein the powered device periodically transmits information and wherein the frequency of transmission of the information is adjusted based on the availability of energy to be delivered.

17. The method of any of claim 10, wherein harvested energy is stored using one or more capacitors.

18. The method of any of claim 10, wherein harvested energy is stored using one or more rechargeable batteries.

19. An apparatus comprising:
- a photovoltaic cell configured to convert light energy to electricity;
- one or more capacitors configured to store electric power generated by the photovoltaic cell;
- a sensor device powered by one or more of electric power generated by the photovoltaic cell or stored electric power delivered from the one or more capacitors; and
- a controller for managing delivery of electric power delivered to the sensor device wherein the controller is configured to at least:
- determine a previous power-off state of the controller before the controller entered a power-on state, wherein the determined previous power-off state is either a dead mode state or a deep sleep mode state, wherein in the dead mode state a clock does not keep time of the length of time of the dead mode state and in the deep sleep mode state the clock keeps time of the length of time of the deep sleep mode;
- performing at least one dead mode state action if the determined previous power-off state is the dead mode state wherein the controller starts the clock, or performing at least one deep sleep mode action if the determined previous power-off state is the deep sleep mode state, wherein the controller reads the clock to determine the length of time of the deep sleep mode;
- wherein the at least one deep sleep mode action includes alternating between an operating mode during which electric power is delivered to the sensor device and a deep sleep mode during which no electric power is delivered to the sensor device and the controller maintains a sufficient operational state to be aware of when it needs to alternate to the operational mode, wherein when insufficient stored electric power is available to continue alternating between the deep sleep mode and the operating mode, the sensor is shut down and the dead mode state is entered.

20. The apparatus of claim 19, wherein the controller determines its previous state upon being awakened into a power-on state.

* * * * *